United States Patent
Black

(10) Patent No.: US 6,508,006 B1
(45) Date of Patent: Jan. 21, 2003

(54) APPARATUS FOR PRODUCING A HORIZONTAL FOUNDATION FOR A MASONRY WALL

(76) Inventor: Tom Black, P.O. Box 90964, Henderson, NV (US) 89009

( * ) Notice: Subject to any disclaimer, the term of this patent is extended or adjusted under 35 U.S.C. 154(b) by 0 days.

(21) Appl. No.: 09/965,325

(22) Filed: Sep. 28, 2001

(51) Int. Cl.[7] .............................................. G01C 15/06
(52) U.S. Cl. ...................................................... 33/293
(58) Field of Search ........................ 33/293, 294, 295, 33/296, 1 CC, 1 G

(56) References Cited

U.S. PATENT DOCUMENTS

| | | | |
|---|---|---|---|
| 833,880 A | * 10/1906 | Keuffel ......................... 33/294 |
| 1,735,892 A | * 11/1929 | Clausen et al. ............... 33/296 |
| 1,754,334 A | * 4/1930 | Quigley ........................ 33/296 |
| 2,713,722 A | * 7/1955 | Henderson ................... 33/294 |
| 2,818,653 A | 1/1958 | Henderson |
| 3,375,587 A | * 4/1968 | Seeley .......................... 33/293 |
| 3,890,717 A | 6/1975 | Haun |
| 4,060,909 A | 12/1977 | Collins et al. |
| 4,228,588 A | 10/1980 | Horton, Jr. |
| 4,471,532 A | 9/1984 | Francis |
| 4,662,077 A | 5/1987 | Richardson |
| 4,813,494 A | 3/1989 | Beard et al. |
| 4,820,041 A | 4/1989 | Davidson et al. |
| 5,667,021 A | 9/1997 | Bailey et al. |
| 5,685,082 A | 11/1997 | Proulx |
| 5,687,486 A | 11/1997 | Foltz |
| 5,829,147 A | 11/1998 | Kousek et al. |
| 6,076,267 A | 6/2000 | Gotoh |
| 6,166,802 A | * 12/2000 | Kodaira et al. ............... 33/293 |

* cited by examiner

Primary Examiner—G. Bradley Bennett
(74) Attorney, Agent, or Firm—Norman Rainer

(57) ABSTRACT

Apparatus is provided for marking grade stakes driven into the ground for the purpose of facilitating formation of a level string line to establish a horizontal foundation for the construction of a masonry wall. The apparatus includes a stake-engaging component having an attached retaining component capable of slidably securing a vertically moveable elongated positioning rod. Attached to the positioning rod is a rod-eye device capable of receiving a leveling beam from a distantly located laser transmitter, thereby producing a visual and/or audible signal which dictates the elevational distance of the positioning rod above the horizontal foundation. A marking guide at the bottom of the positioning rod enables a worker to mark the stake at the proper elevational distance.

9 Claims, 4 Drawing Sheets

APPARATUS FOR PRODUCING A HORIZONTAL FOUNDATION FOR A MASONRY WALL

BACKGROUND OF THE INVENTION

1. Field of the Invention

This invention concerns a device for marking successive stakes so as to establish a horizontal baseline for elongated masonry structures, and more particularly relates to the production of masonry walls by the stacking of uniform construction units.

2. Description of the Prior Art

The accurate positioning of two distantly separated points within the same horizontal plane has long been a primary consideration of surveying techniques. The use of laser beam level devices has facilitated easier and more accurate surveying applications.

In the construction of elongated masonry structures such as building foundations and cross terrain walls, it is important to establish a level foundation consisting of a first row of building blocks positioned upon a stable footing such as poured concrete. The production of a level foundation and subsequent wall structure is usually accomplished by driving metal stakes, known as grade stakes, into the ground in a sequence along the desired path of the wall, and causing a taut string to engage the stakes at a proper elevation for guiding the pouring of concrete or placement of masonry building units In order to establish the proper elevation of the level string, each stake has to be marked so as to accurately indicate the site of string wrapping or tying. Such marking of grade stakes has been accomplished by surveying techniques. In one such technique, a laser level transmitter is employed in conjunction with a receiver, called a "rod-eye," which is attached to a long stick that can be hand-held in vertical position. The lower extremity of the stick is held against the grade stake, and a mark is made on the grade stake when the rod-eye indicates by an audible or visual signal that it is on the same horizontal plane as the laser transmitter unit.

The stick employed in such marking technique is usually of six foot height and 1"×2" cross section, and the rod-eye is attached to the top of the stick. Workers have found it difficult to stabilize the lower extremity of the stick along the grade stake for marking because of the top heavy nature of the stick with rod-eye. Such manipulation is particularly difficult when the grade stake is not vertical.

In instances where an outdoor wall runs across terrain that is not level, it is generally necessary to create a stepped wall wherein the foundations of successive segments of the linear extent of the wall are at different elevations, but still horizontally disposed. The difference in elevation between such successive segments is generally caused to be equal to the height of one or more construction units employed in making the wall. For example, in a masonry wall constructed of building blocks of 8" height, an elevational difference of 8" between contiguous wall segments would cause all the blocks to maintain a horizontal disposition in straight lines. No simple provision has heretofor been disclosed for enabling a rod-eye affixed to the stick to easily and accurately adjust to the different elevations required in successive stepped segments of a wall on non-level terrain.

It is accordingly an object of the present invention to provide apparatus for use with laser leveling techniques for marking grade stakes so as to facilitate formation of a level string line to establish a horizontal foundation for a masonry wall.

It is another object of this invention to provide apparatus as in the foregoing object particularly well suited for use in masonry walls employing blocks of uniform height.

It is a further object of the present invention to provide apparatus of the aforesaid nature which is easily adjustable for producing a stepped wall.

It is yet another object of this invention to provide apparatus of the aforesaid nature compatible with grade stakes that are not vertical.

It is a still further object of the present invention to provide apparatus of the aforesaid nature of simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by an apparatus for marking grade stakes driven into the ground and having an upper extremity, said marking being for the purpose of facilitating formation of a level string line to establish a horizontal foundation for the construction of a masonry wall, said apparatus comprising:

a) stake engaging means securable upon a stake and having retaining means to slidably accommodate and secure a vertically moveable member, b) a straight positioning rod elongated between top and bottom extremities defining the length thereof, and having a uniform rectangular cross-sectional configuration with consequently formed four elongated flat surfaces oriented as front and rear surfaces, outer side surface and stake-directed side surface, c) track means in lengthwise association with said stake-directed side surface and interactive with said retaining means to permit vertical sliding movement of said positioning rod, d) a story rod slidably secured by said front surface and containing a scale of linear measurement indicia which facilitates repeat measurements of constant length, e) a rod-eye mounted upon said story rod and adapted to receive a leveling beam from a distantly located laser transmitter and produce a visual and/or audible signal in response to receipt of said leveling beam, said signal dictating the elevational distance of said positioning rod above said horizontal foundation, and f) marking guide means associated with the bottom extremity of said positioning rod to facilitate placement of a mark upon said grade stake representing the location for tying a level string that tautly extends between sequentially contiguous stakes.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
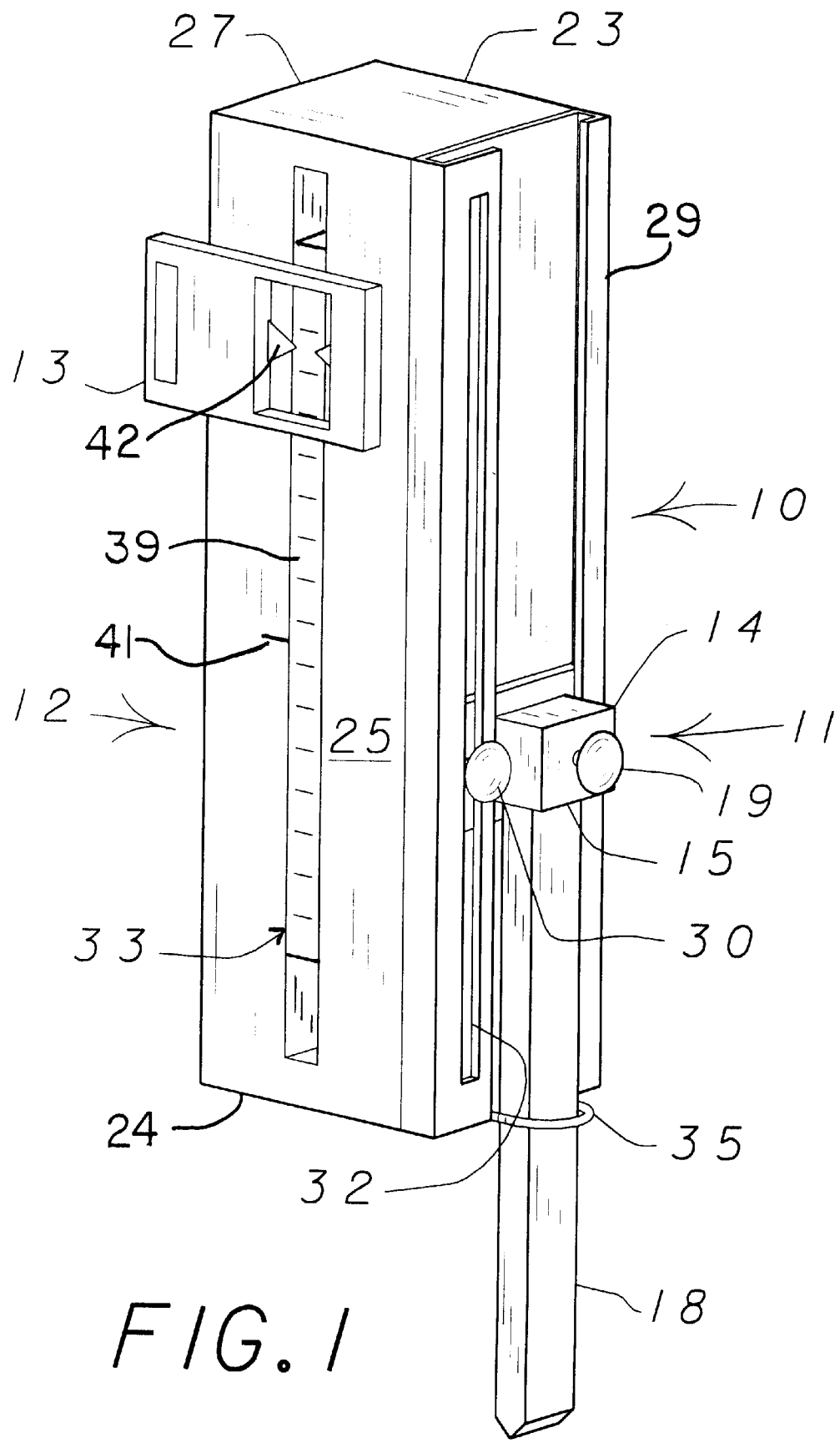
FIG. 1 is a perspective view of an embodiment of the apparatus of the present invention shown in operational association with a grade stake.
Figure 2:
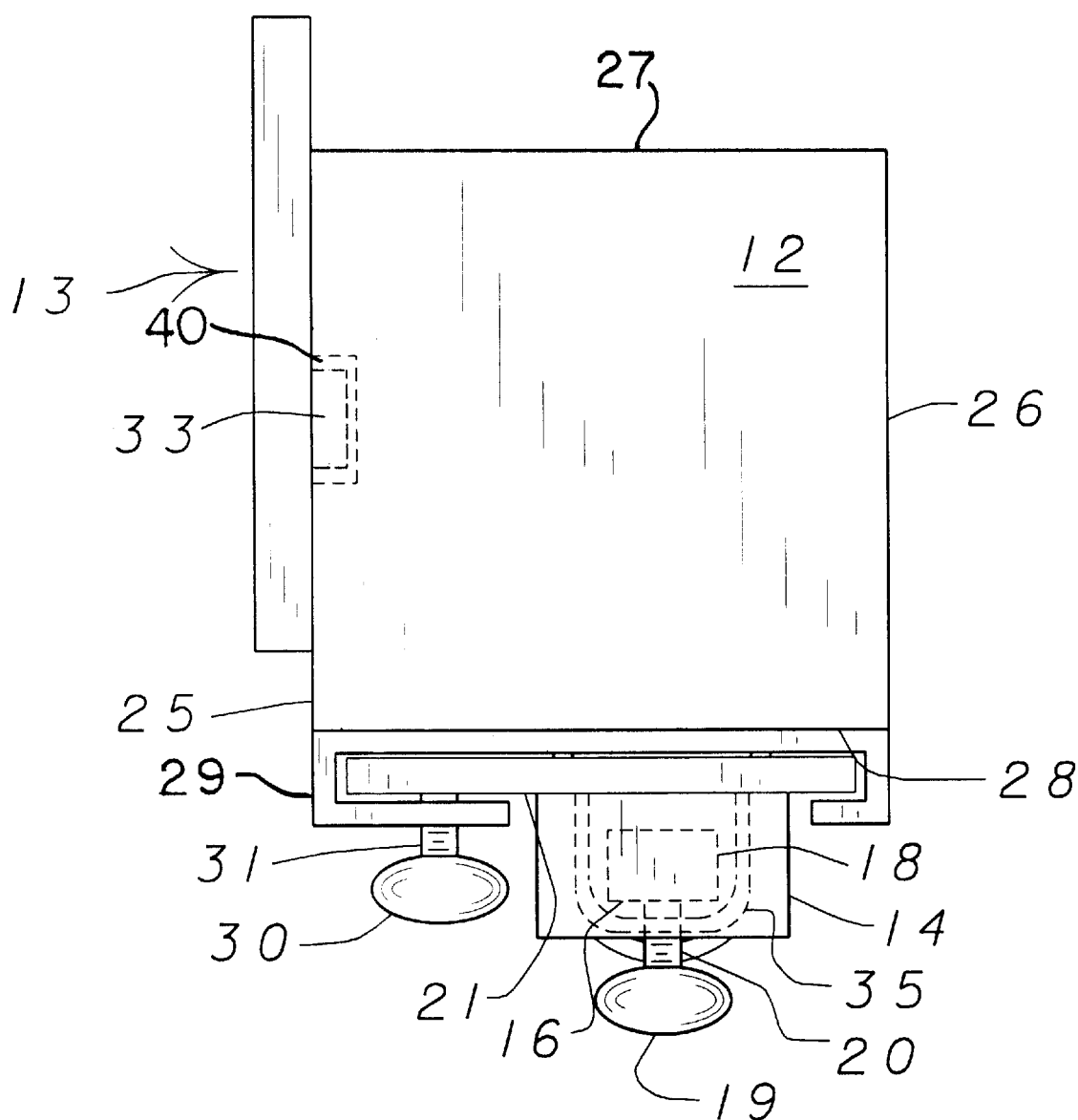
FIG. 2 is a top view of the embodiment of FIG. 1.
Figure 3:
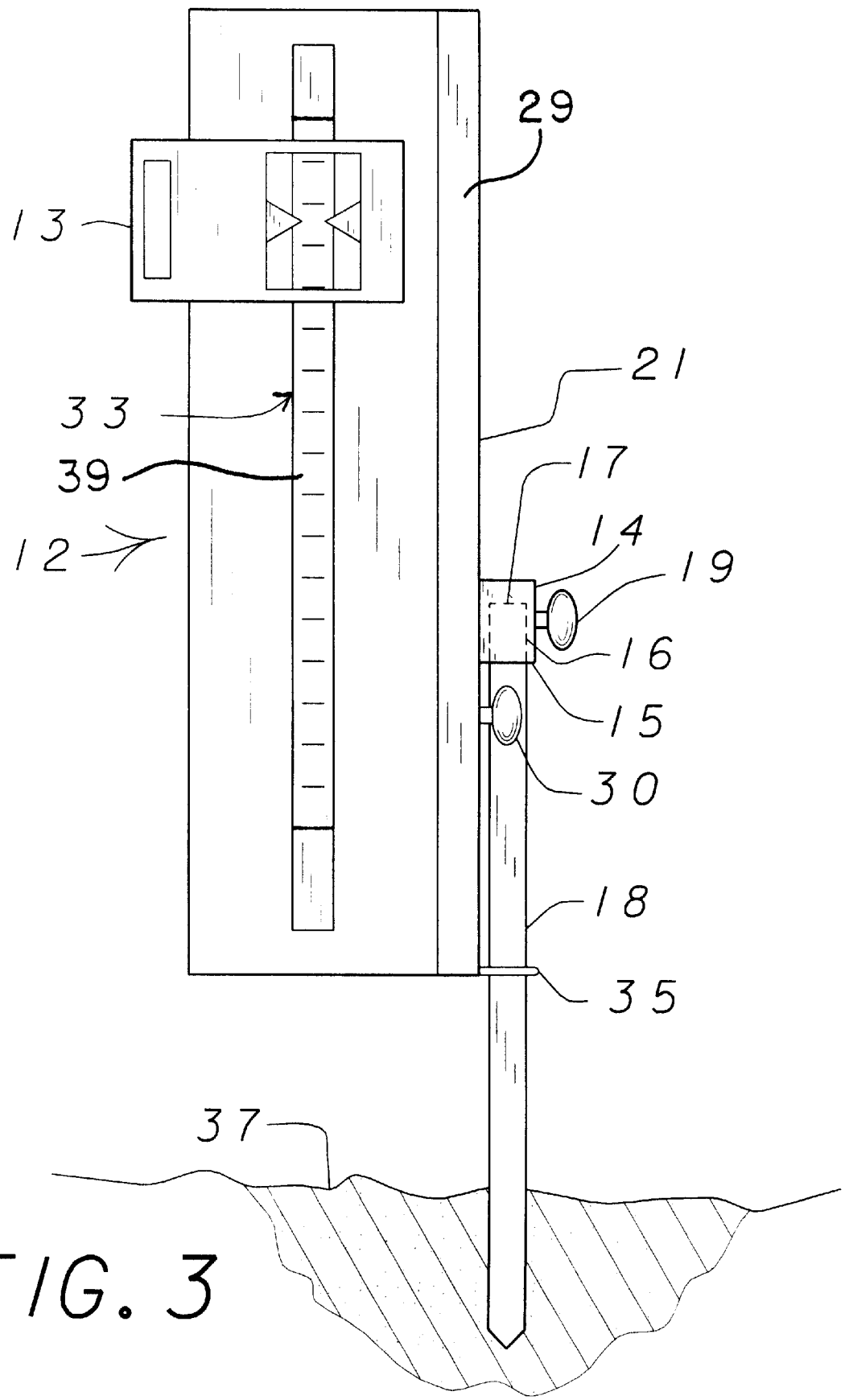
FIG. 3 is a side view of the embodiment of FIG. 1 shown in further association with a concrete footing for an outdoor masonry wall.
Figure 4:
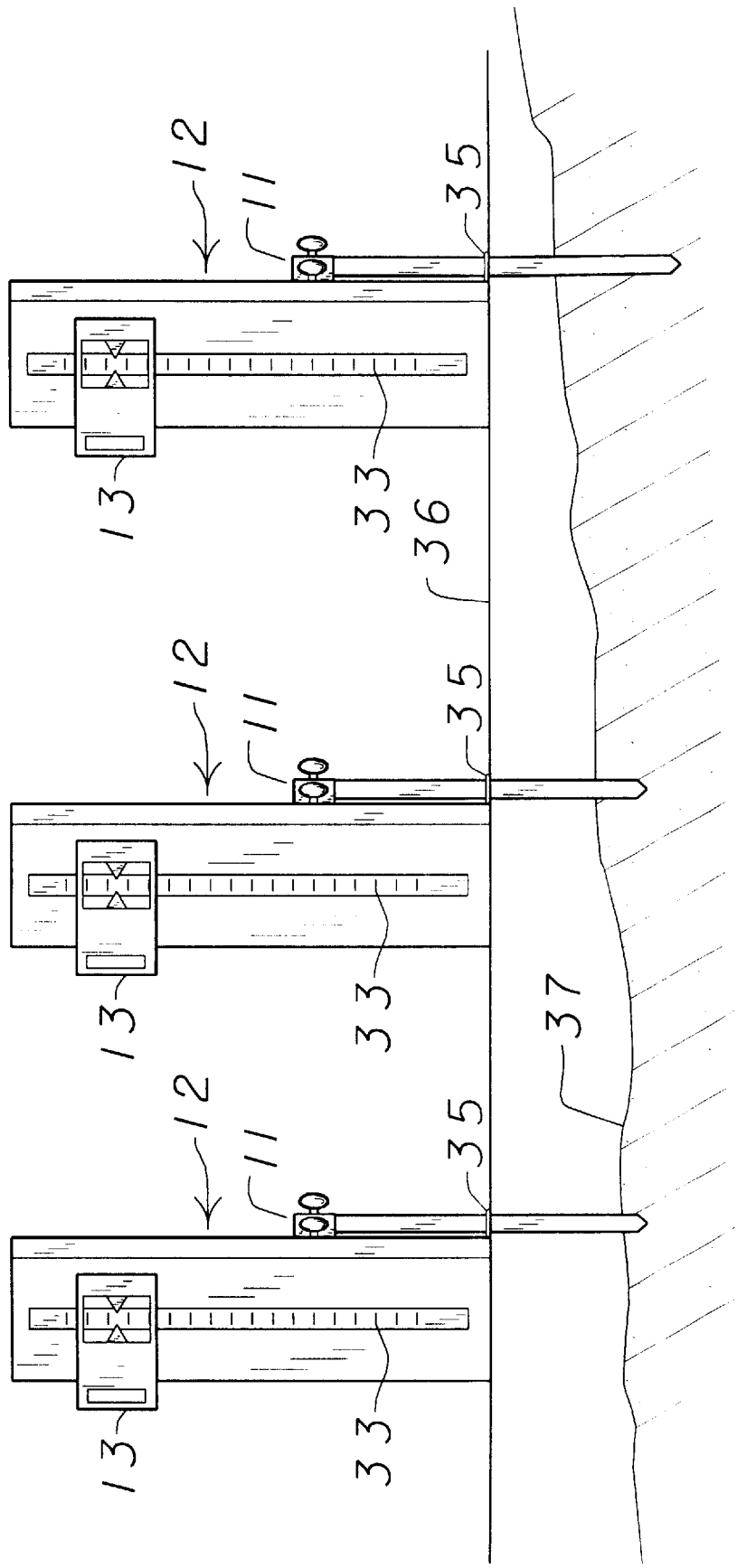
FIG. 4 shows in side view a series of grade stake markings made with the apparatus of FIG. 1.

Referring now to FIGS. 1—4, an embodiment of the apparatus 10 of this invention is shown comprised of stake engaging means 11 interactive with positioning rod 12, and rod-eye 13 slidably associated with said positioning rod.

Stake engaging means 11 is comprised of a block 14 having a lower surface 15 which provides access to a bore 16 extending vertically within said block. Bore 16 is preferably inwardly tapered in the upward direction and is configured and dimensioned so as to receive the upper extremity 17 of grade stake 18. Said grade stakes are generally of metal construction, having a length of 24 to 36 inches and a circular or rectangular cross-sectional diameter of about one inch.

A locking knob 19 having a threaded shaft 20 may be associated with block 14 in communication with bore 16, whereby block 14 may be secured upon the grade stake. Retaining means in the form of slide plate 21 is attached to one face of block 14 for the purpose of slidably accommodating and securing a vertically moveable straight member exemplified as positioning rod 12. Said positioning rod is elongated between top and bottom extremities 23 and 24, respectively, which define the length of said rod, and has a uniform rectangular cross-sectional configuration with consequently formed four elongated flat side surfaces. Said side surfaces consist of front and rear surfaces 25 and 26, respectively, outer side surface 27, and stake-directed side surface 28.

Track means in the form of bracket 29 is attached to stake-directed side surface 28, and extends the length of positioning rod 12. Bracket 29 is configured to slidably embrace slide plate 21. A second securing knob 30 having a threaded shaft 31 is interactive between slide plate 21 and bracket 29 for locking the elevational position of positioning rod 12. A vertical slot 32 in bracket 29 permits elevational movement of said positioning rod past threaded shaft 31.

A story rod 33 having a series of linear measurement indicia in the form of scale 39 is disposed in front surface 25. Said scale preferably has a repetitive sequence of linear distance units which corresponds to the height of building blocks employed. For example, if a building block is eight inches high, repeat sequences of eight inches are indicated in scale 39. The embodiment of story rod 33 illustrated in FIG. 1 is slidably positionable within slot 40 in front surface 25 of positioning rod 12. A stationary zeroing reference mark 41 may be disposed upon surface 25 in interactive association with scale 39.

Rod-eye 13, attached to rod 33, is adapted to receive and detect a leveling beam emitted from a distantly located laser transmitter. When such beam is detected, the rod-eye produces a visual and/or audible signal. Said signal dictates the elevational distance of positioning rod 12 above string line 36, and defines a horizontal plane which is parallel to said string line and a fixed distance therefrom.

Suitable laser systems for use in the apparatus of the present invention are described in U.S. Pat. Nos. 4,221,483; 4,820,041 and 5,829,147. The complete disclosures of said patents are incorporated herein by reference.

Marking guide means in the form of lateral extension 35 attached to the bottom extremity of positioning rod 12 extends to close proximity with said grade stake. Said extension, exemplified as a loop that encircles the stake, facilitates placement of a mark upon the grade stake by the worker. Said mark represents the location for tying a level string 36 that tautly extends between sequentially contiguous stakes.

The apparatus of this invention is applied sequentially to grade stakes, whereby said stakes are properly marked to produce a level string line regardless of the slope of the terrain 37. In some applications, the stakes and levelling procedure may be employed in association with an existing poured concrete footing. When a site of said sloped terrain is reached which cannot accommodate a horizontal foundation at the same elevation as the contiguously preceding segment of the wall being constructed, the rod-eye is moved up or down by a distance equal to the height of the building blocks being employed to construct the wall. For example, when the foundation must be stepped up by one row of blocks because of a rising incline in the terrain, the rod-eye is moved downwardly by a unit of distance corresponding to the height of the block. Such action requires that positioning rod 12 be raised the corresponding amount with an equal rise of said marking guide means 35.

In alternative embodiments, the story rod may be fixed or may be otherwise replaced with a fixed linear scale, and the rod-eye is adapted to slidably traverse the fixed scale. In such case, pointing means 42 on said rod-eye may be used to indicate the elevational position along scale 39. In a still further embodiment, the movement of the rod-eye may be mechanized by way of battery-driven components within the interior of positioning rod 12.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An apparatus for marking grade stakes driven into the ground for the purpose of facilitating formation of a level string line to establish a horizontal foundation for the construction of a masonry wall, said apparatus comprising:

a) stake engaging means securable upon a stake and having retaining means to slidably accommodate and secure a vertically moveable member, b) a straight positioning rod elongated between top and bottom extremities defining the length thereof, and having a uniform rectangular cross-sectional configuration with consequently formed elongated flat surfaces including a front surface and contiguous stake-directed side surface, c) track means in lengthwise association with said stake-directed side surface and interactive with said retaining means to permit vertical sliding movement of said positioning rod, d) a scale of linear measurement indicia associated with said front surface, said scale facilitating repeat measurements of constant length, e) a rod-eye slidably associated with said front surface and adapted to receive a leveling beam from a distantly located laser transmitter and produce a visual and/or audible signal in response to receipt of said leveling beam, said signal dictating the elevational distance of said positioning rod above said horizontal foundation, and f) marking guide means associated with the bottom extremity of said positioning rod to facilitate placement of a mark upon said grade stake representing the location for tying a level string that tautly extends between sequentially contiguous stakes.

2. The apparatus of claim 1 further including a story rod slidably associated with said front surface.

3. The apparatus of claim 2 wherein said scale of linear measurement is disposed on said story rod.

4. The apparatus of claim 3 wherein said rod-eye is attached to said story rod.

5. The apparatus of claim 1 wherein said stake engaging means comprises a block containing a vertical bore which fits onto said stake.

6. The apparatus of claim 5 wherein said retaining means is a slide plate attached to said block.

7. The apparatus of claim 6 further equipped with securing means including a threaded shaft interactive between said slide plate and track means to lock the elevational position of said positioning rod.

8. The apparatus of claim 7 wherein said track means is provided with a vertical slot to permit elevational movement of said positioning rod past said threaded shaft.

9. The apparatus of claim 1 wherein said marking guide means extends laterally from said stake-directed side surface and encircles said stake.

* * * * *